United States Patent [19]

Utamura et al.

[11] 4,147,587
[45] Apr. 3, 1979

[54] METHOD FOR DETECTING THE FAILURE OF NUCLEAR FUEL ELEMENTS

[75] Inventors: Motoaki Utamura, Kitaibaraki; Shunsuke Uchida, Hitachi, both of Japan

[73] Assignee: Hitachi, Ltd., Japan

[21] Appl. No.: 773,172

[22] Filed: Mar. 1, 1977

[30] Foreign Application Priority Data

Mar. 3, 1976 [JP] Japan .................. 52/22187

[51] Int. Cl.$^2$ .............................................. G21C 17/00
[52] U.S. Cl. ................................................. 176/19 LD
[58] Field of Search ............................. 176/19, 37, 80

[56] References Cited

U.S. PATENT DOCUMENTS

| | | | |
|---|---|---|---|
| 3,073,767 | 1/1963 | Whitman et al. | 176/19 LD |
| 3,419,467 | 12/1968 | Holzer et al. | 176/19 LD |
| 3,762,993 | 10/1973 | Jones | 176/19 LD |
| 3,801,441 | 4/1974 | Jones | 176/19 R |
| 3,983,741 | 10/1976 | Honig et al. | 176/19 LD |
| 4,010,068 | 3/1977 | Cooper | 176/37 |
| 4,034,599 | 7/1977 | Osborne | 176/19 LD |

Primary Examiner—Samuel W. Engle
Assistant Examiner—S. A. Cangialosi
Attorney, Agent, or Firm—Craig & Antonelli

[57] ABSTRACT

After a nuclear reactor is shut down, the top of a nuclear fuel assembly in the core of a reactor pressure vessel is covered with a cap through which an air supply line, a warm water supply line and a sampling line extend. Air is supplied through the air supply line to form an air layer in the cap to stop the passage of a current of cooling water through the fuel assembly. A portion of the cooling water in the reactor pressure vessel is pumped up and heated to prepare warm water which is supplied through the warm water supply line to the fuel assembly so as to replace the cooling water in the fuel assembly by the warm water. After the fuel assembly is filled with the warm water, the fuel assembly is allowed to stand as it is for a predetermined period of time, and then a portion of the warm water in the fuel assembly is sampled. The radioactivity of the sample of the warm water is measured thereby to detect whether any of the nuclear fuel elements constituting the fuel assembly under test is a faulty element.

25 Claims, 8 Drawing Figures

METHOD FOR DETECTING THE FAILURE OF NUCLEAR FUEL ELEMENTS

BACKGROUND OF THE INVENTION

This invention relates to methods for detecting the failure of nuclear fuel elements, and more particularly it deals with a method for detecting the failure of nuclear fuel elements wherein the degree of precision with which the failure of any of the nuclear fuel elements is detected can be increased by supplying warm water to the interior of a nuclear fuel assembly.

Generally, the nuclear fuel elements constituting each of the fuel assemblies arranged in a pressure vessel of a nuclear reactor have the hazard of failing when used for a prolonged period of time. From the standpoint of safety of operation of the nuclear reactor, it is not desirable to use fuel assemblies containing faulty fuel elements, because radioactive materials are released from the faulty fuel elements into cooling water which functions as coolant, with the result that nuclear fission fragments in the cooling water increase in amount. Thus, the present practice requires inspection of the fuel assemblies at regular intervals, and fuel assemblies containing faulty fuel elements are replaced by new ones.

In a boiling-water reactor, detection of faulty nuclear fuel elements is started in about 5 to 7 days after the nuclear reactor is shut down. This is because the reactor pressure vessel has a high concentration of radioactivity and it takes a considerable number of days for the concentration to be lowered. Also, it is a time-consuming operation to remove the top cover of the reactor pressure vessel, the drier in the reactor pressure vessel and the steam separator after the concentration of radioactivity in the pressure vessel is lowered. Moreover, the need to provide a pool for water over the reactor pressure vessel is one of the factors concerned in a delay in initiation of an operation for detecting faulty fuel elements.

A plurality of nuclear fuel assemblies are arranged in the core of a reactor pressure vessel. Even after shutdown of the nuclear reactor, a current of cooling water serving as coolant is constantly supplied to the reactor pressure vessel and flows through the fuel assemblies to remove decay heat generated by the nuclear fuel elements constituting each fuel assembly. The cooling water heated by the decay heat is led out of the reactor pressure vessel, cooled and returned to the reactor pressure vessel.

A method of the prior art for detecting faulty nuclear fuel elements in a boiling-water reactor will first be described. The fuel assemblies arranged in a reactor pressure vessel are located such that their upper ends are disposed about 10 meters below the liquid surface of a pool of cooling water over the reactor pressure vessel. The cooling water in the aforesaid pool and the reactor pressure vessel is hereinafter referred to as reactor cooling-water. Each nuclear fuel assembly comprises a channel box and a plurality of nuclear fuel elements arranged therein. The fuel assemblies are mounted in a reactor core in the pressure vessel. The top of each fuel assembly is covered with a cap having an air supply line and a sampling pipe extending therethrough. Air is supplied to the interior of the cap through the air supply line to form an air layer in the cap. The provision of this air layer results in the formation of a liquid level in the upper portion of the fuel assembly.

The formation of the liquid level in the fuel assembly results in the blocking of the passage of cooling water through the fuel assembly, so that decay heat generated by the fuel elements is not removed completely. Thus, the temperature in the fuel assembly rises and, if there are faulty fuel elements, fission products will be released into the cooling water through the damaged portions. The cooling water is also heated, and the fission products released into the heated cooling water are dissolved therein and dispersed by natural convection within the fuel assembly. After the lapse of scores of minutes following the mounting of the cap on the top of the fuel assembly, a sample of the cooling water in the upper portion of the fuel assembly is taken through the sampling pipe and radioactivity thereof is measured. Judgement of whether there are faulty fuel elements in the fuel assembly is passed on the basis of the radioactivity determined as the result of the test.

The aforementioned method of the prior art for detecting faulty nuclear fuel elements has some disadvantages. First, since it is after 5 or 7 days have elapsed following shutdown of the nuclear reactor that an operation for detecting faulty nuclear elements is performed, the amount of heat in the cooling water generated by decay heat of the fuel elements is small, and the fission products released from the faulty portions of the fuel elements are very small in amount, when tests are performed. More specifically, if the internal pressure of a nuclear fuel element became higher than its external pressure due to a rise in the temperature of the fuel element, then fission products would be released from the fuel element to outside. However, since 5 to 7 days have elapsed after the nuclear reactor is shut down when tests are performed, the internal pressure of the fuel element has been reduced to a level at which it is substantially the same as its external pressure. Accordingly, the fission products released from the fuel elements are very small in amount and consequently the degree of precision with which the existence of faulty fuel elements is detected is very low. The released fission products are dispersed in the cooling water in the fuel assembly due to natural convection of the cooling water in the fuel assembly. Owing to the fact that a sample of the cooling water is taken from the water in the upper portion of the fuel assembly, there is no alternative but to wait for the released and dissolved fission products to reach the upper portion of the fuel assembly by natural convection, which is time-consuming. Particularly, when the failure of a fuel element or elements occurs in the lower portion of the fuel assembly, difficulty is encountered in detecting the existence of a faulty fuel element or elements because of the facts that the fission products released into the cooling water are very small in amount and that it takes a long time for the fission products to reach the upper portion of the fuel assembly.

SUMMARY OF THE INVENTION

An object of the present invention is to improve the degree of precision with which the existence of a faulty nuclear fuel element or elements is detected.

Another object is to reduce the time required for detecting the existence of a faulty nuclear fuel element or elements.

Still another object is to improve the degree of precision with which the existence of damage in the lower portion of a nuclear fuel element is detected.

Still another object is to avoid the dispersion of coolant containing fission products while the procedure of detecting a faulty nuclear fuel element or elements is practiced.

A further object is to remove radioactive material from reactor coolant while the procedure of detecting a faulty nuclear fuel element or elements is practiced.

One of the features of the invention lies in the fact that a portion of coolant in a nuclear power plant is heated to a temperature level higher than that of a reactor coolant, the heated coolant is supplied to each of the fuel assemblies located in the reactor coolant, a predetermined time is allowed to elapse after stopping the supply of the heated coolant to each fuel assembly, a sample of the heated coolant in each fuel assembly is taken, and the radioactivity of the sample of the coolant is measured.

According to the invention, nuclear fuel elements are heated by the heated coolant, and this promotes release of fission products from the damaged portion of a fuel element, with the result that the degree of precision with which the existence of a faulty fuel element is detected is strikingly improved.

Another feature of the invention lies in the fact that a portion of reactor coolant surrounding nuclear fuel assemblies is heated to a temperature level higher than that of the reactor coolant in each nuclear fuel assembly, the heated reactor coolant is supplied to each of the fuel assemblies so as to fill the fuel assembly with the heated reactor coolant, a predetermined time is allowed to elapse after stopping the supply of the heated reactor coolant to each fuel assembly, a sample of the heated reactor coolant in each fuel assembly is taken, and the radioactivity of the sample of the reactor coolant is measured.

According to the invention, the existence of a damaged portion in the lower portion of a nuclear fuel element can be detected with an improved degree of precision and at the same time the dispersion of the reactor coolant containing the highest concentration of radioactivity can be prevented.

DESCRIPTION OF THE PREFERRED EMBODIMENTS

Figure 1:
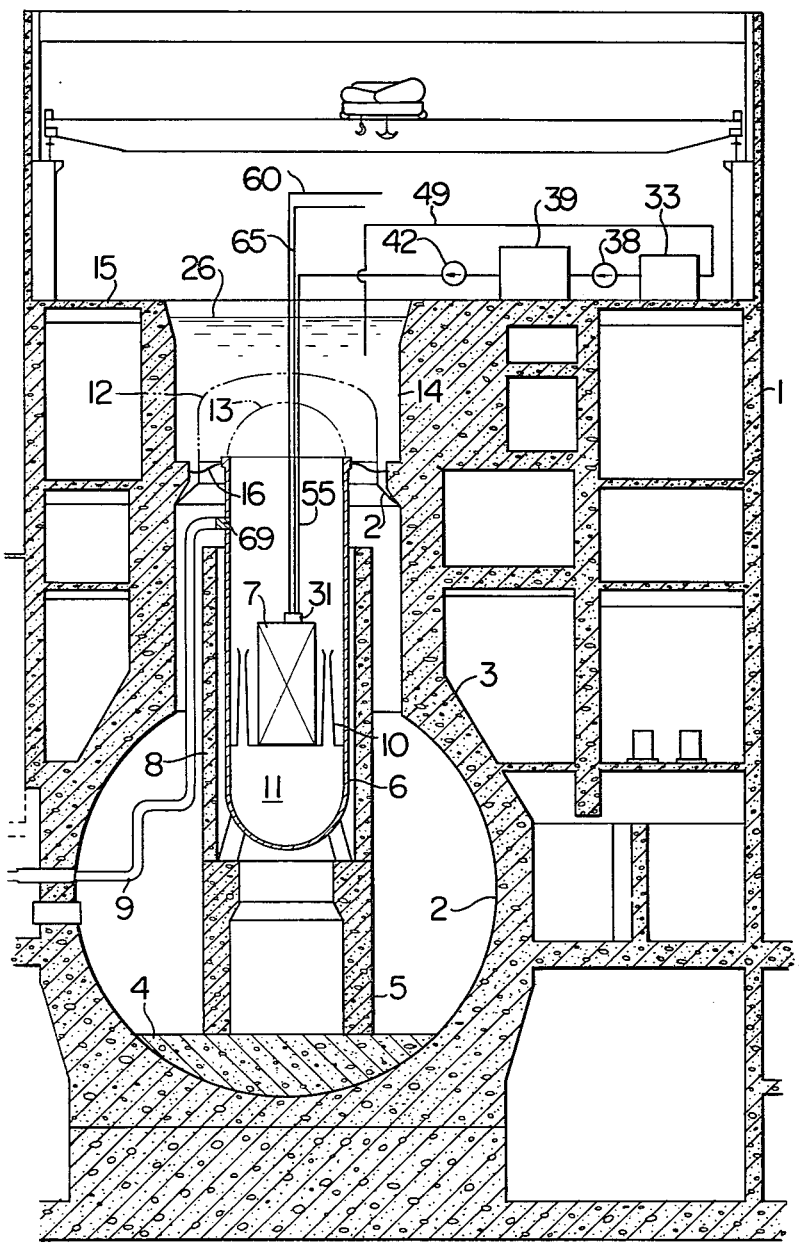
FIG. 1 is a view in explanation of a boiling-water reactor incorporating therein the method for detecting faulty nuclear fuel elements comprising a preferred embodiment of the present invention.

The method for detecting faulty nuclear fuel elements comprising a preferred embodiment of the invention as applied to a boiling-water reactor will now be described. FIG. 1 shows the inner structure of a reactor housing for a reactor of the boiling-water type. The reactor housing 1 has mounted therein a reactor containment vessel 2 which is surrounded by a concrete wall 3 of the reactor housing 1. Disposed in the lower portion of a reactor containment vessel 2 is a bottom concrete 4 deposited therein and supporting a pedestal 5 which supports thereon a reactor pressure vessel 6. The reactor pressure vessel 6 includes a reactor core 7 consisting of a plurality of nuclear fuel assemblies 17 shown in FIG. 2. The pressure vessel 6 is enclosed by a gamma ray shield member 8 mounted on top of the pedestal 5. A main steam line 9 connected at one end thereof to an upper portion of the pressure vessle 6 is connected at the other end thereof to a turbine (not shown) by extending through the containment vessel 2 and the concrete wall 3.

When the boiling-water reactor constructed as aforesaid is in operation, upper openings of the containment vessel 2 and the pressure vessel 3 are sealed by covers 12 and 13 respectively. At this time, cooling water fed to the interior of the pressure vessel 6 reaches the reactor core 7 through jet pumps 10 and a lower plenum 11 by means of a recycling system. The cooling water is heated by passing through the fuel assemblies 17 to cool the same and converted into steam which is fed to the turbine through the main steam line 9.

An operation for detecting the existence of a faulty fuel element or elements will now be described. Such operation is performed after lapse of 5 to 7 days following shutdown of the nuclear reactor. First, the covers 12 and 13 attached to the upper portion of the containment vessel 2 and the pressure vessel 6 respectively are removed. Then, a plug 69 is inserted in the end portion of the main steam line 9 opening in the pressure vessel 6, and cooling water is fed to a pool 14 and an upper portion of the pressure vessel 6. The pool 14 is located beneath an operating floor 15 which is disposed in the highest position in the reactor housing 1, and disposed over the containment vessel 2 and the pressure vessel 6. A sealing plate 16 is attached between the concrete wall 3 and the containment vessel 2 and between the containment vessel 2 and the pressure vessel 6, in order to prevent the cooling water in the pool 14 from falling between the concrete wall 3 and the containment vessel 2 and between the containment vessel 2 and the pressure vessel 6.

The construction of each of the fuel assemblies 17 arranged in the reactor core 7 will be described in detail with reference to FIG. 2. Each fuel assembly 17 consists of a plurality of nuclear fuel elements 18 each having $UO_2$ pellets contained in a thin cladding, an upper tie plate 19 and a lower tie plate 20 to which the fuel assemblies 18 are individually affixed at opposite ends thereof, spacers 21 arranged between the upper and lower tie plates 19 and 20 for maintaining the fuel elements 18 in suitably spaced relationship from one another, and a channel box 22 secured to the upper tie plate 19 for mounting therein the fuel elements 18. Each fuel assembly 17 is supported at its lower end by a lower core support plate 23 and at its upper end by an upper core support plate 24. Cooling water is introduced into a space defined by the lower tie plate 20 through an opening 25 from the lower plenum 11 which is disposed beneath the lower core support plate 23, and then flows into the channel box 22, from which the cooling water flows upwardly between the adjacent fuel elements 18 until finally it is discharged from the fuel assembly 17 through the upper tie plate 19.

The temperature of the cooling water in the reactor pressure vessel 6 and the pool 14 when an operation for detecting a faulty fuel element 18 performed is kept at about 30° C. This is for the sake of lessening the hazards of exposing the operators to radiation by reducing the amount of nuclear fission products released from the fuel assemblies 17 in the reactor core 7 in the pressure vessel 6.

A faulty fuel element detecting apparatus adapted to carry into practice the method for detecting the failure of nuclear fuel elements comprising one embodiment of the invention will be described with reference to FIG. 2. The faulty fuel element detecting apparatus 30 comprises a box-shaped cap 31, a warm water supply system 32, an air supply system 57, and a sampling system 61.

The warm water supply system 32 comprises a cooling water purifying device 33 connected to one end of a line 49 which is inserted at the other end into the cooling water in the pool 14 beneath the liquid level 26, a warm water tank 39 connected through a line 54 to an outlet side of the cooling water purifying device 33, and a warm water supply line 55 connected at one end to the warm water tank 39 and inserted at the other end into the cap 31. A pump 38 and a valve 47 are mounted in the line 54, while a pump 42 and a valve 48 are mounted in the warm water supply line 55. Mounted in the warm water tank 39 is a heater 40 which is connected to a power source 41. A return line 56 connected at one end to a portion of the warm water supply line 55 between pump 42 and valve 48 is connected at the other end through a valve 49' to the warm water tank 39.

Figure 3:
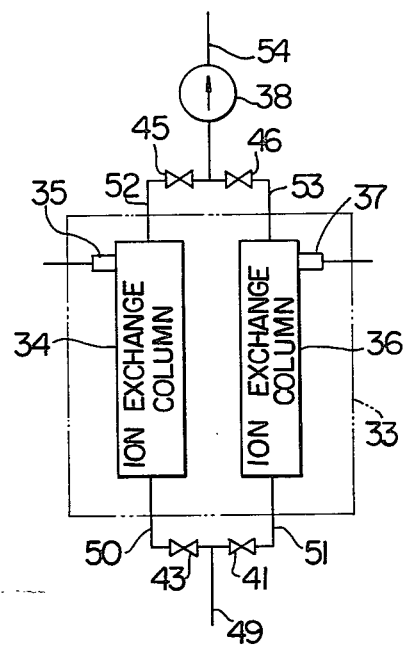
FIG. 3 is a detailed systematic view of the radioactive material removing device shown in FIG. 2.

As shown in FIG. 3, the cooling water purifying device 33 comprises ion exchange columns 34 and 36 which have attached to their outlets radiation detectors 35 and 37 respectively. Ion exchange column 34 is connected at its inlet side to line 49 through a line 50 which mounts a valve 43, while ion exchange column 37 is connected at its inlet side to line 49 through a line 51 which mounts a valve 44. Ion exchange column 34 is connected at its outlet side to line 54 through a line 52 which mounts a valve 45, while ion exchange column 36 is connected at its outlet side to line 54 through a line 53 which mounts a valve 36. Besides the warm water supply line 55 of the warm water supply system 32, all the parts are mounted on the operating floor 15.

Referring to FIG. 2 again, the air supply system 57 comprises a blower 58, and an air supply line 60 connecting the blower 58 to the cap 31 and mounting a valve 59. The sampling system 61 comprises a container 62 for containing a sample, a pump 64 for pumping up a sample of cooling water, a sampling line 66 connected at one end to the pump 64 and inserted at the other end into the cap 31, and a line 65 connected at one end to pump 64 and inserted at the other end into the container 62, line 65 mounting a valve 63. Like the warm water supply system 32, the air supply system 57 and the sampling system 61 are mounted on the operating floor 15.

Operation of the faulty fuel element detecting apparatus constructed as aforementioned will be described. The cap 31 is applied to the top of one of the fuel assemblies 17 to detect whether or not any one of the fuel elements 18 contained therein is faulty. The cap 31 is placed on the upper core support plate 24. The warm water supply line 55, air supply line 60 and sampling line 66 are in the form of flexible tubes to facilitate the movement of the cap 31. Then the blower 58 is actuated to supply a current of air into the cap 31 through the air supply line 60 by opening the valve 59. This creates an air layer 67 in the cap 31 and a liquid level 68 in the channel box 22. The flow of the cooling water passing through the fuel assembly 17 which is tested to see if it contains any faulty fuel element 18 is blocked by the presence of the air layer 67, with the result that the upper end of this fuel assembly 17 is separated from the upper ends of other fuel assemblies 17. Then pump 38 is actuated to pump up the cooling water in the pool 14 into ion exchange column 34 through lines 49 and 50. At this time, valves 43 and 45 are open and valves 44 and 46 are closed. Radioactive materials, particularly radioactive iodine and cesium used as tracers for determining whether or not a faulty fuel element exists, are removed from the cooling water at ion exchange column 34. The cooling water purified in this way is fed to the warm water tank 39 through line 54. When radiation detector 35 gives an indication of the fact that the radiation level in ion exchange column 34 has reached a predetermined level, valves 44 and 46 are opened and valves 43 and 45 are closed (See FIG. 3). This causes the cooling water pumped up through line 49 to be fed to ion exchange column 36, while ion exchange column 34 is replaced by a new one as cooling water is fed to ion exchange column 36. Thus purification of cooling water can be effected continuously.

The cooling water fed to the warm water tank 39 is heated by the heater 40. Instead of using the heater 40, steam may be injected into the cooling water in the warm water tank 39. Also, a pipe through which steam flows may be mounted in the warm water tank 39. The cooling water in the warm water tank 39 is heated by the heater 40 to a temperature level higher than that of the cooling water in the fuel assembly 17, so that the cooling water is turned into warm water. The description of operation of the apparatus will proceed by assuming that the warm water has a temperature of 50° C. By actuating pump 42, the warm water prepared in this way is fed through the warm water supply line 55 to the fuel assembly 17 which is blocked at its upper end by the air layer 67. At this time, valve 48 is opened and valve 49' is closed.

Figure 4:
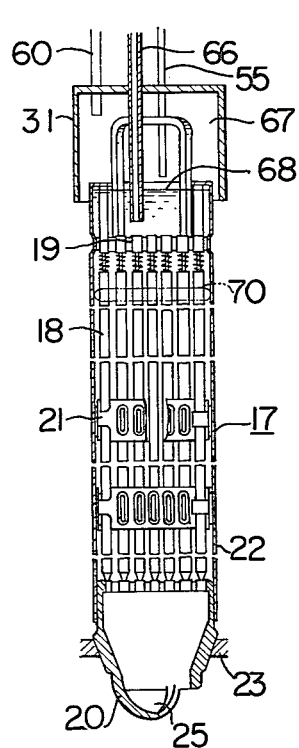
FIG. 4 is a view showing the temperature boundary layer formed in a nuclear fuel assembly in initial stages of supply of heated cooling water to the fuel assembly.
Figure 5:
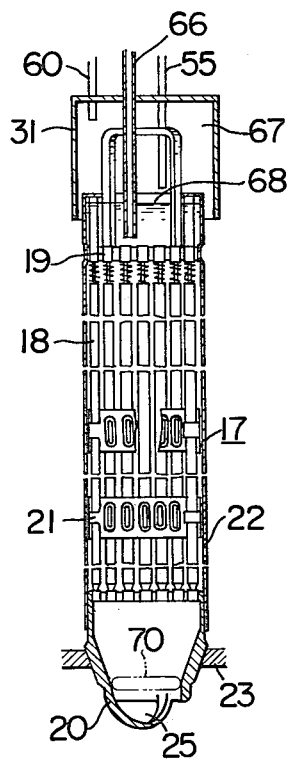
FIG. 5 is a view showing the temperature boundary layer formed in a nuclear fuel assembly when the latter is filled with heated cooling water.
Figure 6:
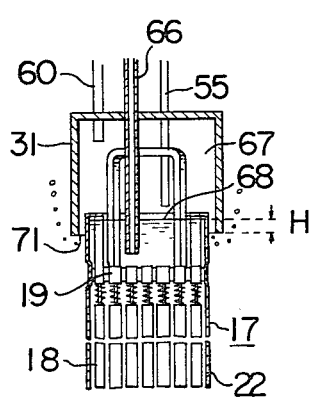
FIG. 6 is a view in explanation of the principle of the downward flow of heated cooling water in a fuel assembly.

Owing to the temperature difference between the warm water supplied to the fuel assembly 17 through the warm water supply line 55 and the cooling water originally existing in the channel box 22 of the fuel assembly 17, a different temperature zones defining boundary 70 is created in the channel box 22 of the fuel assembly 17 as shown in FIG. 4. This boundary 70 moves downwardly as the warm water fed to the fuel assembly 17 increases in amount until it reaches the bottom portion of the fuel assembly 17 as shown in FIG. 5. In this way, the cooling water originally existing in the fuel assembly 17 is replaced by warm water containing no nuclear fission products. The power responsible for causing the warm water to flow downwardly is the difference H in liquid level between the liquid level 68 inside the channel box 22 and a liquid level 71 outside the channel box 22 shown in FIG. 6. If the inner liquid level 68 is higher than the outer liquid level 71 by 5 centimeters, the warm water flows downwardly in the fuel assembly 17 at a linear velocity of about 10 cm/S.

The cooling water contained in one fuel assembly 17 is about 40 liters in quantity. To replace the cooling water in a fuel assembly by warm water requires about 40 liters of warm water. If the heater 40 is of a capacity of 10 KW, one has only to heat about 40 liters of cooling water for bout 10 minutes to raise its temperature from 30° C. to 50° C.

After 40 liters of warm water has been fed to the fuel assembly 17, valve 49' is opened to return warm water to the warm water tank 39. At the same time, valve 48 is closed and the fuel assembly 17 to which warm water has been fed is allowed to stand as it is for several minutes. During this period of time, the boundary 70 is located in the lowermost portion of the fuel assembly 17, so that no cold cooling water containing radioactive materials and existing in the lower plenum 11 invades the fuel assembly 17 from below.

Figure 7:
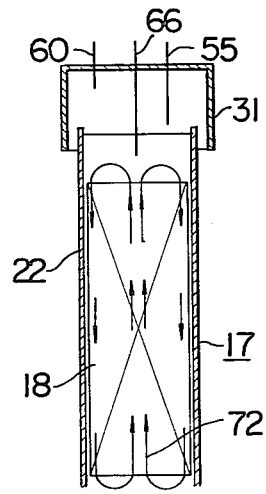
FIG. 7 is a view in explanation of flow pattern due to natural convection in a nuclear fuel assembly after the latter is filled with heated cooling water.

If the fuel assembly 17 full of warm water is allowed to stand as it is, then the temperature of the nuclear fuel elements 18 in the fuel assembly 17 rises. This causes the internal pressure of each nuclear fuel element 18 to rise. Thus, if any of the nuclear fuel elements 18 is faulty, large amounts of nuclear fission products will be released and dissolved into the warm water through the damaged portion of the fuel element. A study of the temperature distribution in a cross-sectional area of the fuel assembly 17 shows that the temperature of the warm water in the central portion of the fuel assembly 17 is higher than that of the warm water in the peripheral portion thereof due to dissipation of heat from the channel box 22 to the cold cooling water surrounding it. The difference in temperature between the central portion and the peripheral portion of the fuel assembly 17 acts as a force for producing natural convection 72 as shown in FIG. 7, with the result that the warm water in the fuel assembly 17 flows in an upwardly directed current in the central portion and in a downwardly directed current in the outer peripheral portion. This vigorously agitates the motion of the warm water in the fuel assembly 17. Thus, the warm water disposed near the damaged portion of a fuel element 18 and containing large amounts of nuclear fission products quickly flows through the fuel assembly and reaches the upper portion of the fuel assembly 17 where sampling of the water is carried out.

After allowing the warm water fed into fuel assembly 17 to stand as it is for several minutes, pump 64 (See FIG. 2) is actuated to take a sample of the warm water in the upper portion of the fuel assembly 17 through the sampling line 66 and collected in the sample container 62. Then, identification of radionuclides and determination of the radioactivity in the sample are carried out by means of a radiation detector. The determination of presence or absence of a faulty nuclear fuel element consists in comparison of the intensity of radioactivity of a nuclide (iodine or cesium, for example) of a suitable half life existing in the sample with the normal intensity of radioactivity of such nuclide in cooling water.

In the embodiment shown and described hereinabove, the supply of warm water to the interior of a nuclear fuel assembly 17 promotes the release of nuclear fission products from the damaged portion of a nuclear fuel element 18, thereby improving the degree of precision with which the presence of a faulty nuclear fuel element is detected. Moreover, since the flow of the warm water in the fuel assembly 17 is promoted by natural convection, the time required for detecting the existence of a faulty nuclear fuel element can be markedly shortened. Particularly when the fuel assembly 17 is filled with warm water as shown in FIG. 5, natural convection takes place in the whole of the fuel assembly 17, Thus, the nuclear fission products released from the damaged portion in the lower part of a fuel element 18 can readily pass on to the upper portion of the fuel assembly 17. This improves the degree of precision with which the existence of a faulty fuel element having a damaged portion in its lower portion is detected.

In this embodiment, since the cooling water in the pool 14 is pumped up and heated into warm water to be supplied to a nuclear fuel assembly 17, no change is caused to occur in the inventory of the cooling water in the reactor pressure vessel 6 and the pool 14 or reactor cooling water. This eliminates the need to cause the reactor cooling-water to overflow, and makes it unnecessary to remove radioactive material contained in overflowed water. The concentration of radioactivity of the cooling water in the reactor pressure vessel 6 can be lowered to a certain degree, since the radioactive materials contained in the cooling water are removed by a reactor purifying system (not shown). However, it is impossible to completely remove radioactive materials from the cooling-water in the reactor pressure vessel 6. So, if water other than the reactor cooling-water is heated and supplied to each of the fuel assemblies 17, then it is necessary to cause the reactor cooling-water to overflow, to remove radioactive material from the overflowed water.

In the embodiment of the invention shown and described above, the cooling water in each fuel assembly 17 is replaced by warm water from which nuclear fission products or radioactive materials have been removed by passing cooling water through the purifying device 33 before being heated into the warm water. Thus, when the method according to the invention is used for detecting a faulty nuclear fuel element, the radioactivity of a sample of cooling water in a sound fuel element 17 is almost zero. On the other hand, when a fuel assembly tested by the method according to the invention has a faulty fuel element therein, greater amounts of nuclear fission products are found in a sample of cooling water than when it is tested by a method of the prior art for reasons described above. Because of this, determination of the presence or absence of a faulty fuel element is facilitated and the degree of precision with which the existence of a faulty fuel element is detected is improved.

Moreover, since the cooling water purified by the purifying device 33 is returned to the reactor core 7 again, it is possible to reduce the load applied to the nuclear reactor purifying system and to lessen the hazards of the operators being exposed to radioactivity. For example, when the described embodiment of the invention has application in a nuclear reactor power plant of a capacity of 500,000 KW, the total volume of reactor cooling-water processed by the purifying device 33 is about 50 cubic meters. Since a nuclear reactor has an inventory of reactor cooling-water of about 150 cubic meters, about ⅓ the total volume of reactor cooling-water can be purified if the aforesaid embodiment of the invention is carried into practice. Thus, the radioactivity of reactor cooling-water can be lowered to a great extent.

In a conventional nuclear reactor, processing of 50 cubic meters of reactor cooling-water by means of an ion exchange column results in an accumulation of a dose of radiation of 1 curie therein. This makes it necessary to replace the used ion exchange column by a new one as aforementioned in order to reduce the amount of a dose of radiation to which the operators might be exposed.

In the embodiment shown and described above, a cap has been described as being applied to each of the fuel assemblies 17. However, it is to be understood that a cap may be applied to a plurality of fuel assemblies simultaneously. If this is the case, it is necessary to use a plurality of warm water supply lines and sampling lines which are equal in number to the fuel assemblies to which the cap is applied simultaneously.

According to the invention, the cooling water pumped up from the pool 14 may be heated into warm water to be supplied to a fuel assembly or assemblies without passing the pumped cooling water through a purifying device. In this method for detecting a faulty nuclear fuel element, the results achieved are substantially similar to those achieved by the embodiment shown in FIG. 2. The results include the advantage that no change is caused in the inventory of reactor cooling-water. However, when this embodiment is compared with the embodiment shown in FIG. 2, the former has disadvantages in that the radioactivity (background radioactivity) is higher in the former than in the latter and reactor cooling-water is less purified in the former than in the latter.

Another embodiment of the invention will now be described with reference to FIG. 8. The parts similar to those shown in FIGS. 1 and 2 are designated by like reference characters and their description is omitted. Those parts which differ from the parts shown in FIGS. 1 and 2 will only be described. As shown, the main steam line 9 is connected to the turbine 75 which has a condenser 76 mounted in its lower portion. A line 81 connected at one end to the condenser 76 mounts therein a condenser pump 77, a desalinator 78, a feed water pump 79 and a feed water heater 80 in the indicated order, and is connected at the other end to the reactor pressure vessel 6 through the reactor containment vessel 2. A line 86 branching off from a portion of the line 81 between the desalinator 78 and the feed water pump 79 is connected to a condensate storage tank 82 to which lines 73, 84 and 85 are connected. Line 84 connects the condensate storage tank 82 to the condenser 76 through a pump 83; line 73 connects the condensate storage tank 82 to the warm water tank 39 through a pump 74; and line 85 connects the condensate storage tank 82 to a control rod drive mechanism (not shown) mounted below the reactor pressure vessel 6. An overflow line 88 connects the pool 14 to the condensate storage tank 82 through a purifying device 87.

Figure 2:
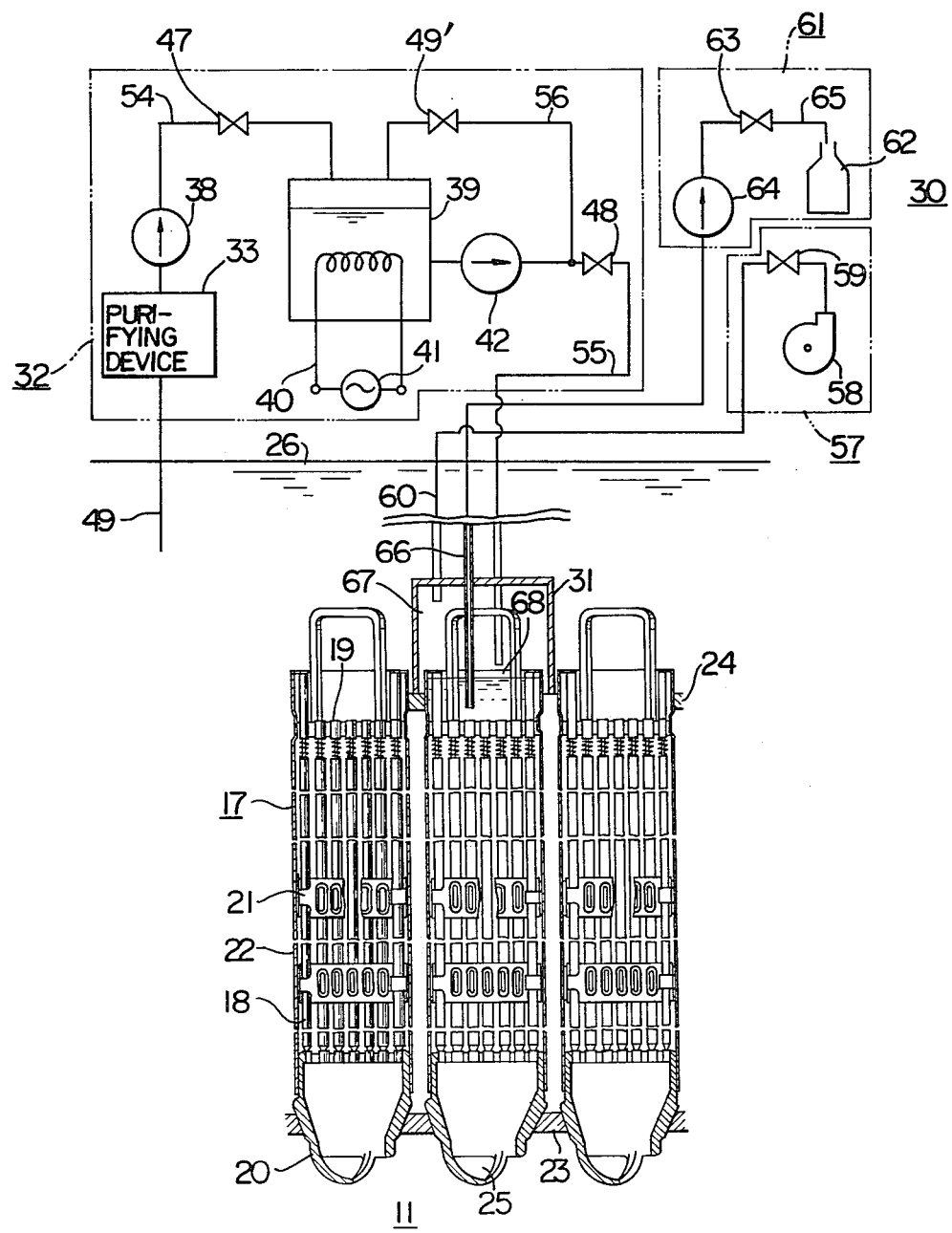
FIG. 2 is a systematic view of an apparatus adapted to carry into practice the method for detecting faulty nuclear fuel elements comprising one embodiment of the invention in applying the method in a boiling-water reactor.
Figure 8:
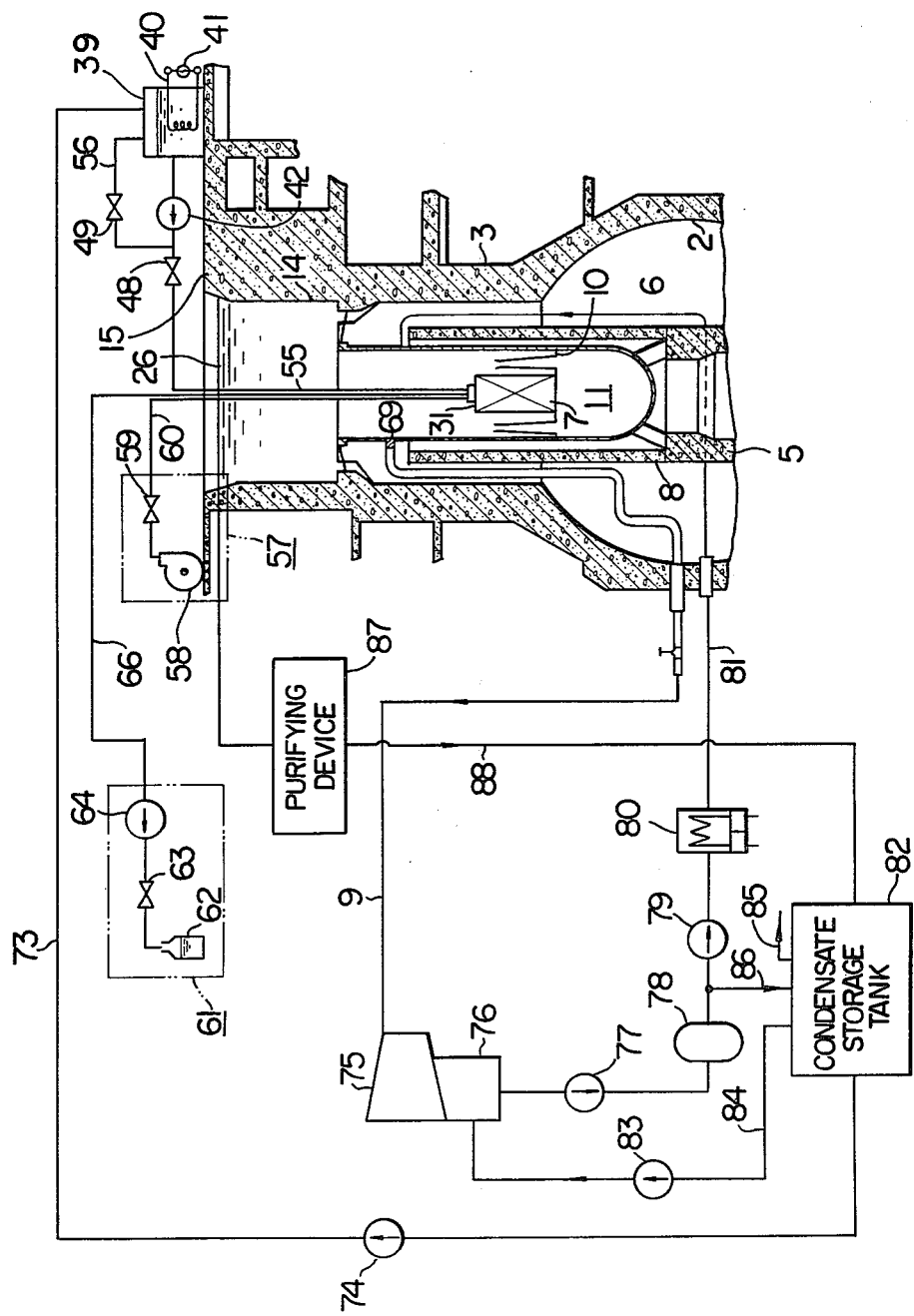
FIG. 8 is a systematic view showing the apparatus adapted to carry into practice another embodiment of the invention.

The warm water supply system of the embodiment shown in FIG. 8 differs from the warm water supply system 32 shown in FIG. 2 in that the warm water tank 39 is connected to the condensate storage tank 82 and no purifying device is mounted in line 73 in the former.

When the nuclear reactor is in operation, the steam supplied through the main steam line 9 to the turbine 75 runs the latter and is condensed by the condenser 76 into cooling water. The cooling water thus obtained is fed by the condenser pump 77 to the desalinator 78 to remove impurities (including radioactive material) therefrom. Then the cooling water is pressurized by the feed water pump 79, heated by the feed water heater 80 and supplied to the pressure vessel 6 through line 81. A portion of the cooling water is stored in the condensate storage tank 82 for use in case of emergency. A portion of the clean cooling water purified by the desalinator 78 is supplied to the condensate storage tank 82 through branch line 86. Actuation of pump 83 supplies cooling water from the condensate storage tank 82 to the condenser 76 as supplementary water.

When an operation for detecting a faulty fuel element is performed, the covers 12 and 13 for the reactor containment vessel 2 and the reactor pressure vessel 6 respectively are removed, and the pool 14 is filled with cooling water. Thereafter, the cap 31 is applied to the top of each of the fuel assemblies 17 which is to be tested for the presence or absence of a faulty fuel element, as shown in FIG. 2. The blower 38 is actuated to form an air layer in the cap 31. Production of warm water is carried out by actuating pump 74 to introduce cooling water from the condensate storage tank 82 to the warm water tank 39 through line 73. Since the cooling water in the condensate storage tank 82 has been purified by the desalinator 68, there is no need to provide a purifying device for purifying condensate from the tank 82 to the warm water tank 39. The cooling water supplied to the warm water tank 39 is heated into warm water and supplied to the fuel assembly 17 to be tested. After the fuel assembly supplied with warm water is allowed to stand as it is for a predetermined period of time, a sample of the warm water in the fuel assembly 17 is taken and collected in the container 62, and the level of radiation of the sample is determined.

Since the cooling water stored in the condensate storage tank 82 is heated and supplied to the fuel assembly 17 to be tested in this embodiment, the inventory of reactor cooling-water increases. If the inventory exceeds a predetermined level, reactor cooling-water is returned through the overflow line 88 to the condensate storage tank 82 after radioactive material is removed therefrom by the purifying device 87.

In this embodiment, there is a little more likelihood of trouble made in controlling the nuclear reactor than in the embodiment shown in FIG. 2, because it is necessary to purify, by the purifying device 87, the reactor cooling-water containing radioactive materials which is made to overflow through the overflow line 88. The embodiment shown in FIG. 8 can achieve the same results as the embodiment shown in FIG. 2, except for the aforesaid disadvantage. In this embodiment, the cooling water in the nuclear power plant is heated to produce warm water, so that no cooling water having the possibilities of having radioactive materials incorporated therein is dispersed to outside from the reactor pressure vessel as is the case with the embodiment shown in FIG. 2.

In the embodiment described above, the cooling water in the condensate storage tank is heated to produce warm water. It is to be understood, however, that the invention is not limited to this form of production of warm water and that warm water can be produced by heating cooling water in a pressure suppressing chamber connected to the lower portion of the reactor containment vessel.

This invention offers the advantage of promoting the release of nuclear fission products from the damaged portion of a faulty nuclear fuel element, thereby improving the degree of precision with which a faulty fuel element or elements are detected.

We claim:

1. A method for detecting the failure of nuclear fuel elements comprising the steps of:
   closing an upper end portion of each of nuclear fuel assemblies located in reactor coolant to block the passage of the reactor coolant through each nuclear fuel assembly;
   heating a portion of coolant in a nuclear power plant to a temperature level higher than the temperature level of reactor coolant in each said nuclear fuel assembly;
   feeding the heated coolant to each said fuel assembly;
   allowing the fuel assembly to stand as it is for a predetermined time interval after feeding of the heated coolant is stopped;
   sampling the heated coolant in the fuel assembly; and
   measuring the radioactivity of a sample of the coolant obtained in the sampling step.

2. A method as claimed in claim 1, further comprising the step of removing radioactive materials from coolant in a nuclear power plant before a portion of said coolant is heated to a temperature level higher than the temperature level of the reactor coolant in each said fuel assembly in the heating step.

3. A method as claimed in claim 1, wherein said coolant heated to a temperature level higher than that temperature level of reactor coolant in each said fuel assembly in the heating step is a portion of the reactor coolant.

4. A method as claimed in claim 3, further comprising the step of removing radioactive materials from said portion of the reactor coolant before the reactor coolant is heated in the heating step.

5. A method as claimed in claim 1, wherein the heated coolant fed to each said fuel assembly in the feeding step is of a quantity such that the heated coolant fills the fuel assembly, and the fuel assembly filled with the heated coolant is allowed to stand as it is for a predetermined period of time after feeding of the heated coolant is stopped.

6. A method as claimed in claim 5, further comprising the step of removing radioactive materials from the coolant before the coolant is heated to a temperature level higher than the temperature level of reactor coolant in each said fuel assembly in the heating step.

7. A method as claimed in claim 5, wherein said coolant heated to a temperature level higher than the temperature level of reactor coolant in each said fuel assembly in the heating step is a portion of the reactor coolant.

8. A method as claimed in claim 7, further comprising the step of removing radioactive materials from said portion of the reactor coolant before the reactor coolant is heated in the heating step.

9. A method as claimed in claim 1, wherein the heating of a portion of coolant is effected outside of each nuclear fuel assembly with the heated coolant being then fed to the fuel assembly.

10. A method as claimed in claim 3, wherein said coolant heated to a temperature level higher than the temperature level of reactor coolant in each said fuel assembly in the heating step is effected outside of each said nuclear fuel assembly and said heated reactor coolant is fed to each said nuclear fuel assembly in the feeding step.

11. A method as claimed in claim 10, wherein the heated reactor coolant fed to each said nuclear fuel assembly in the feeding step is of a quantity such that the heated reactor coolant fills the nuclear fuel assembly, and the nuclear fuel assembly filled with the heated reactor coolant is allowed to stand as it is for a predetermined time interval after feeding to the heated reactor coolant is stopped.

12. A method as claimed in claim 11, further comprising the steps of removing radioactive materials from said portion of the reactor coolant before the reactor coolant is heated in the heating step.

13. A method as claimed in claim 1, further comprising the step of maintaining each of the nuclear fuel assemblies in its respective position within the reactor core during the carrying out of the method for detecting the failure of nuclear fuel elements.

14. A method for detecting the failure of nuclear fuel elements, comprising the steps of:
   closing an upper end portion of each of nuclear fuel assemblies located in reactor coolant and in a core of a nuclear reactor to block the passage of the reactor coolant through each nuclear fuel assembly;
   heating a portion of coolant in a nuclear power plant, outside each said nuclear fuel assembly, to a temperature level higher than the temperature level of the reactor coolant originally existing in each said nuclear fuel assembly;
   feeding the heated coolant to each said nuclear fuel assembly;
   allowing the nuclear fuel assembly to stand as it is for a predetermined time interval after feeding of the heated coolant is stopped;
   sampling the heated coolant; and
   measuring the radioactivity of a sample of the coolant obtained in the sampling step.

15. A method as claimed in claim 14, further comprising the step of removing radioactive materials from coolant to be heated, and wherein the coolant from which radioactive materials have been removed is heated in the heating step to a temperature level higher than the temperature level of the reactor coolant originally existing in each said nuclear fuel element.

16. A method as claimed in claim 14, wherein the heated coolant fed to each said nuclear fuel assembly in the feeding step is of a quantity such that the heated coolant fills the nuclear fuel assembly, and the nuclear fuel assembly filled with the heated coolant is allowed to stand as it is for a predetermined time interval after feeding of the heated coolant is stopped.

17. A method as claimed in claim 16, further comprising the step of removing radioactive materials from coolant to be heated, and wherein the coolant from which radioactive materials have been removed is heated in the heating step to a temperature level higher than the temperature level of the reactor coolant originally existing in each said nuclear fuel assembly.

18. A method as claimed in claim 14, wherein said coolant heated outside each said nuclear fuel assembly to a temperature level higher than the temperature level of the reactor coolant originally existing in each said nuclear fuel assembly in the heating step is a portion of the reactor coolant, and said heated reactor coolant is fed to each said nuclear fuel element in the feeding step.

19. A method as claimed in claim 18, further comprising the step of removing radioactive materials from a portion of the reactor coolant, and wherein the reactor coolant from which radioactive materials have been removed is heated in the heating step.

20. A method as claimed in claim 18, wherein the heated reactor coolant fed to each said nuclear fuel assembly in the feeding step is of a quantity such that the heated reactor coolant fills the nuclear fuel assembly, and the nuclear fuel assembly filled with the heated reactor coolant is allowed to stand as it is for a predetermined time interval after feeding of the heated reactor coolant is stopped.

21. A method as claimed in claim 20, further comprising the step of removing radioactive materials from a portion of the reactor coolant, and wherein the reactor coolant from which radioactive materials have been removed is heated in the heating step.

22. A method as claimed in claim 14, wherein a cap is applied to the upper end portion of each said nuclear fuel assembly and a gas is supplied to the interior of said cap to form a gas layer in the upper end portion of each said nuclear fuel assembly in the step of blocking the passage of the reactor coolant through each said nuclear fuel assembly.

23. A method as claimed in claim 22, wherein said coolant heated outside each said nuclear fuel assembly to a temperature level higher than the temperature level of the reactor coolant originally existing in each said nuclear fuel assembly in the heating step is a portion of the reactor coolant, and said heated reactor coolant is fed to each said nuclear fuel assembly in the feeding step.

24. A method as claimed in claim 23, wherein the heated reactor coolant fed to each said nuclear fuel assembly in the feeding step is of a quantity such that the heated reactor coolant fills the nuclear fuel assembly, and the nuclear fuel assembly filled with the heated reactor is allowed to stand as it is for a predetermined time interval after feeding of the heated reactor coolant is stopped.

25. A method as claimed in claim 24, further comprising the step of removing radioactive materials from a portion of the reactor coolant, and wherein the reactor coolant from which radioactive materials have been removed is heated in the heating step.

* * * * *